F. C. V. LAWS.
PHOTOGRAPHIC CAMERA OF THE TYPE EMPLOYED ON AIRCRAFT.
APPLICATION FILED DEC. 26, 1917.
1,293,479.
Patented Feb. 4, 1919.
5 SHEETS—SHEET 2
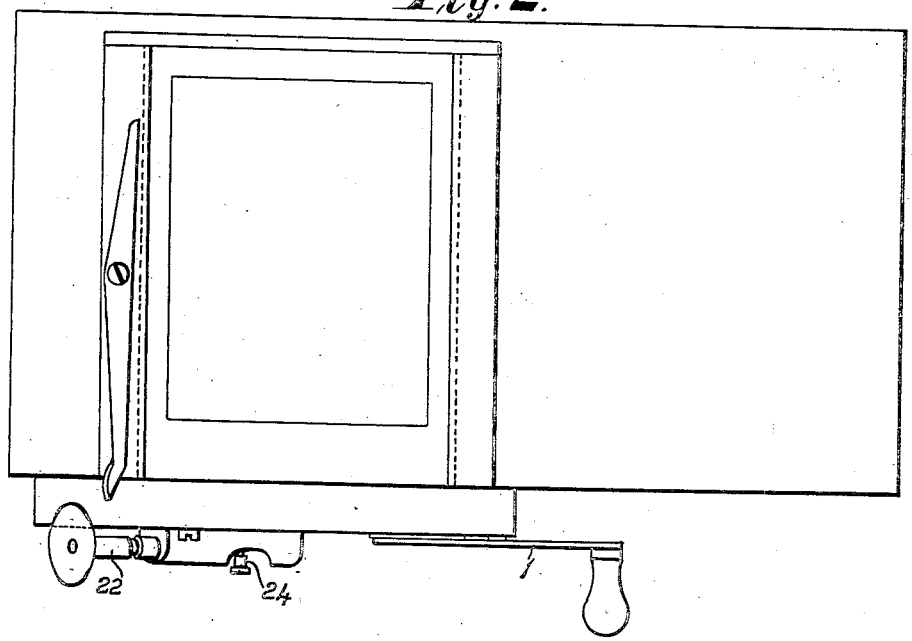
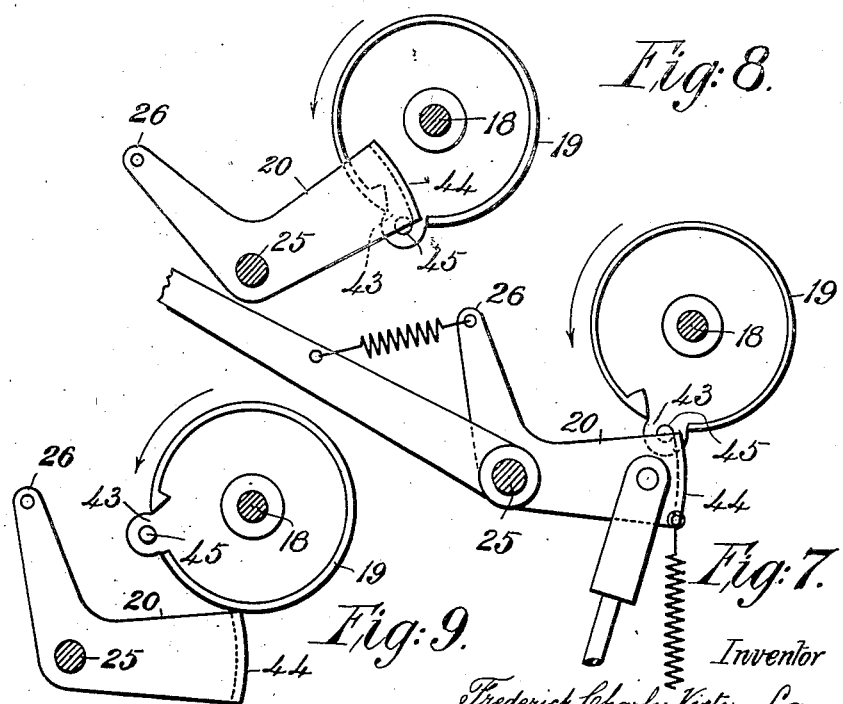
Inventor
Frederick Charles Victor Laws.
per Hubert Sefton Jones
Attorney.

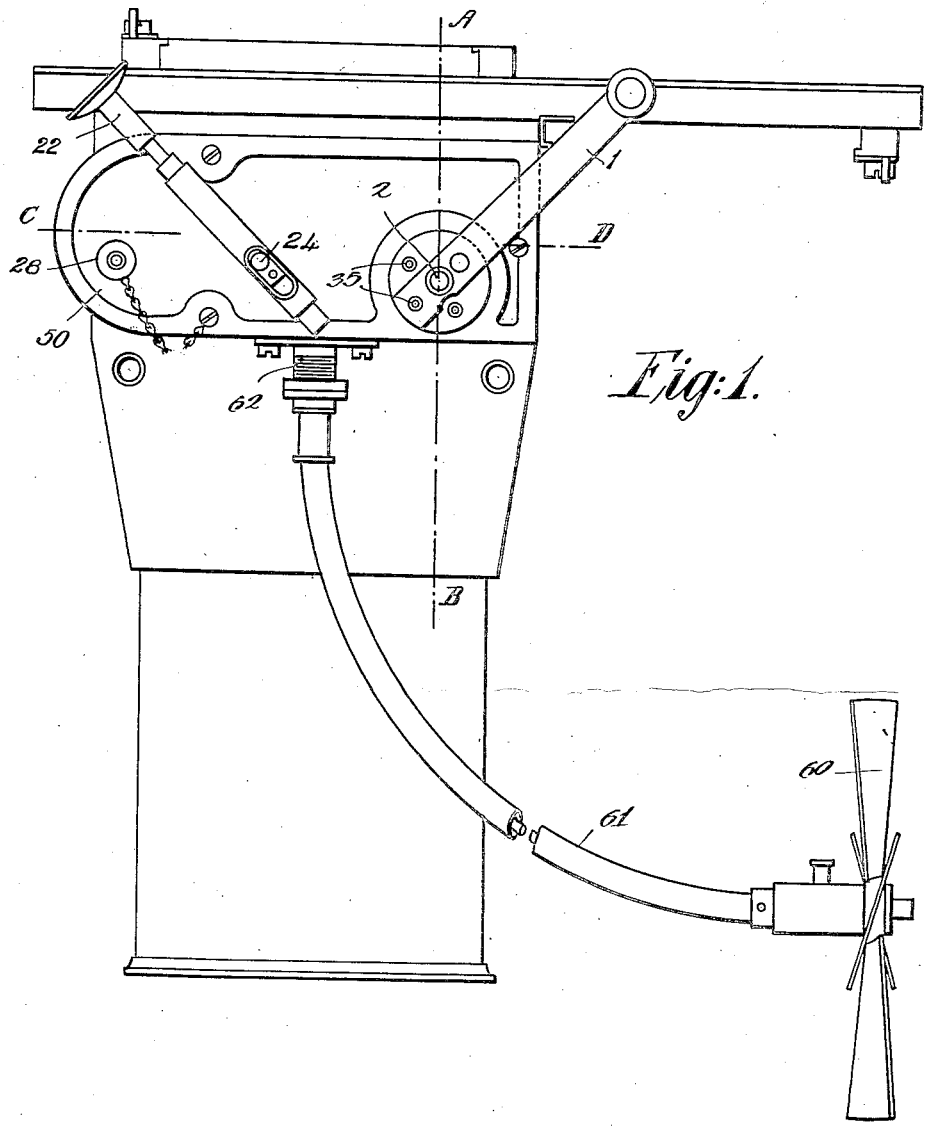

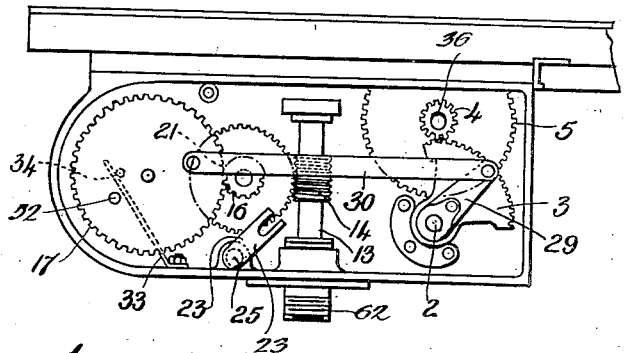
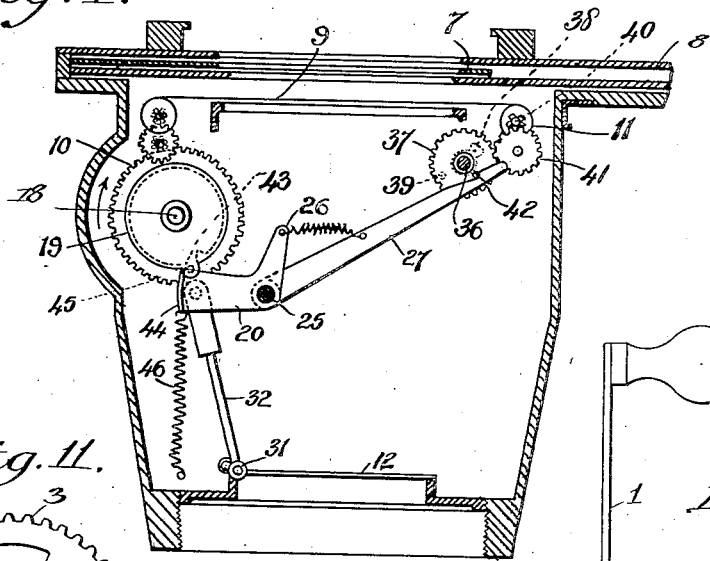
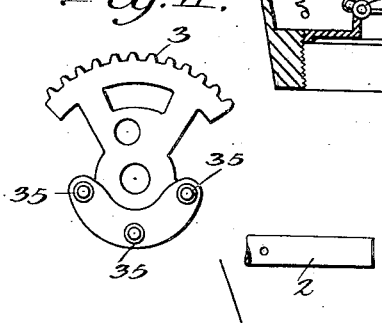
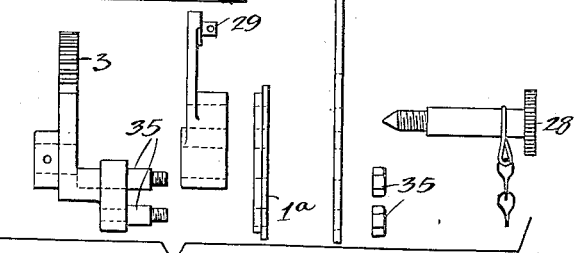

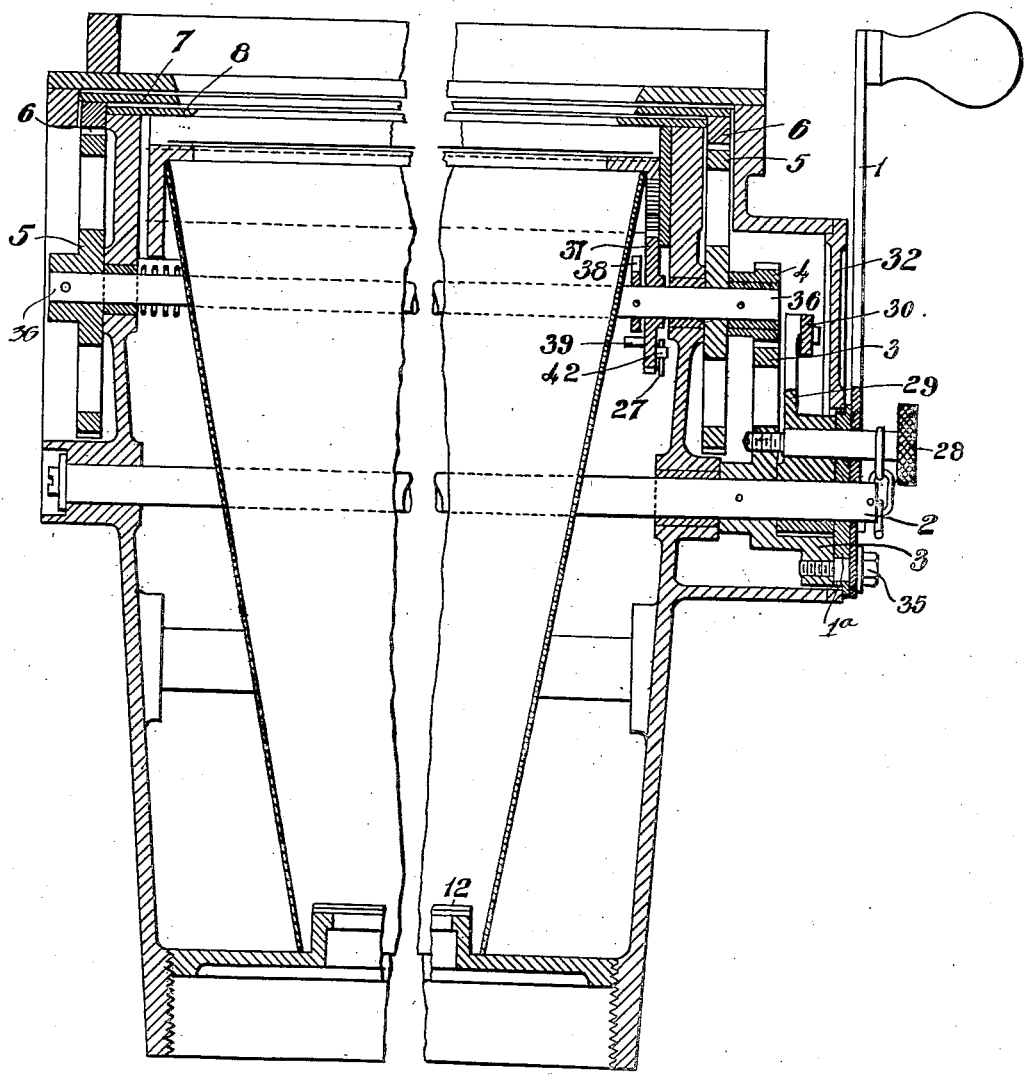

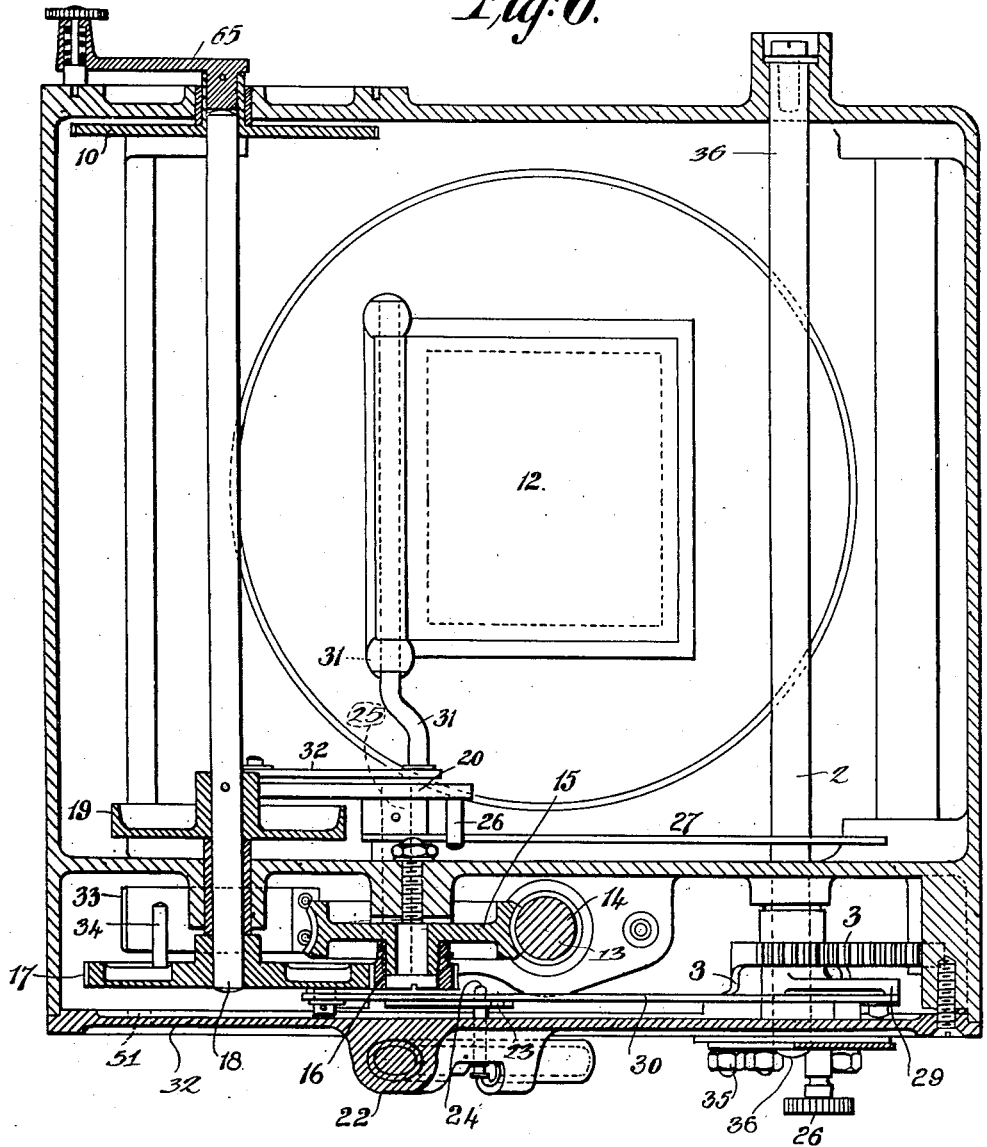

UNITED STATES PATENT OFFICE.

FREDERICK C. V. LAWS, OF UXBRIDGE ROAD, LONDON, ENGLAND.

PHOTOGRAPHIC CAMERA OF THE TYPE EMPLOYED ON AIRCRAFT.

1,293,479.  Specification of Letters Patent.  Patented Feb. 4, 1919.

Application filed December 26, 1917. Serial No. 208,971.

*To all whom it may concern:*

Be it known that I, FREDERICK CHARLES VICTOR LAWS, major in the Royal Flying Corps, a subject of the King of Great Britain and Ireland, residing at 53 Aldbourne road, Uxbridge Road, in the county of London, England, have invented new and useful Improvements in Photographic Cameras of the Type Employed on Aircraft, of which the following is a specification.

My invention relates to improvements in photographic cameras and their operation and more particularly to those cameras of the kind employed in aircraft in which a number of photographs are required to be taken in a short space of time at varying intervals at the will of the operator.

The present invention comprises improvements in the general construction of this type of camera and provides interchangeable locking means adapted to enable the camera to be operated either manually or by means of an air screw, and to provide interlocking and releasing mechanism to prevent misuse of the camera and to insure the correct sequence of operations in changing the plates and re-setting the shutter.

My invention is illustrated in the accompanying drawings, in which—

Figure 1 shows a side view of the camera;

Fig. 2 shows a plan view of Fig. 1;

Fig. 3 shows a side view of the gearing provided for manual or automatic operation of the camera.

Fig. 4 shows a part sectional view of the camera showing the shutter winding, interlocking, and releasing mechanism.

Fig. 5 shows a sectional view on an enlarged scale of line A—B of Fig. 1;

Fig. 6 shows a sectional view on an enlarged scale of line C—D of Fig. 1;

Fig. 7 shows a detail view of the escapement mechanism with the heel of the pallet in a position preventing the rotation of the escapement wheel by its contact with the stop pin.

Fig. 8 shows a detail view of the escapement mechanism in which the heel of the pallet is raised allowing the stop pin to pass beneath it.

Fig. 9 shows a detail view of the escapement mechanism in which the heel of the pallet is out of engagement with the stop pin, but is itself prevented from moving by the flange of the escapement wheel.

Fig. 10 shows a detail view on an enlarged scale of the parts forming the hand-operated gear, and Fig. 11 shows a detail view of the segmental toothed member.

The mechanism for changing the plates and setting the shutter comprises a shaft 2 having mounted thereon a handle 1 rigidly connected by set screws 35 with a segmental toothed member 3 through an interposed washer 1ª, said toothed member engaging with the pinion 4 mounted upon a shaft 36 carrying a pair of larger gear wheels 5, which in turn respectively engage with the racks 6 on the underside of a plate carrier 7. The handle 1 and the segmental toothed member 3 can be locked by means of a removable locking pin 28 with a reciprocating lever 29, freely mounted on the same shaft 2, and thus reciprocated through said lever 29 and a connecting link 30 by a mutilated wheel 17 hereinafter described, adapted to be rotated by an airscrew or like means. If it is desired to manually reciprocate the handle 1, the pin 28 is removed thus disconnecting the mutilated wheel 17 from the segmental member 3. The pin 28 can be used to lock the wheel 17 to the casing 50 by passing the pin through the hole 51 in the casing and the hole 52 in the wheel 17, which holes are in register when the wheel is in the position shown in Fig. 3, and disconnected from the airscrew until the exposure trigger is operated. The said plate carrier 7 is arranged to slide in a rectangular framework 8 forming, for convenience, part of the main framework of a camera body. A blind shutter 9 of well known construction is employed, the operating means being provided for through intermediate gearing between the operating handle 1 and a shutter roller 11. In addition to the roller blind shutter, the camera is provided with a capping flap 12 which is operated during the process of making the exposure.

The mechanism for carrying out the automatic operation of the camera comprises an airscrew 60 (shown in Fig. 1) or propeller conveniently driving the changing mechanism through a flexible shaft, allowing of it being placed in any suitable position by the airman. The flexible shaft is inclosed in a sheath 61, secured to the casing by a coupling 62, and is coupled to the shaft 13 having a worm 14 in engagement with the worm wheel 15 integral with a pinion 16 engaging with a larger mutilated toothed wheel 17.

The larger toothed wheel 17 makes one complete revolution before reaching that portion 21 of the wheel from which the teeth have been removed. The airscrew is then free to rotate without actuating the shutter resetting and plate changing mechanism until the operator releases the shutter by pressing down the trigger 22. When the mutilated wheel is in this position the leaf spring 33 bears upon a pin 34 mounted thereon and will move said mutilated wheel 17 to a position which will allow of the pinion wheel 16 engaging with the teeth of the mutilated wheel as soon as the shutter has been operated thus allowing of the operations of resetting the shutter and changing the plate being carried out. The said mutilated toothed wheel 17 is mounted upon and adapted to rotate a shaft 18 carrying a flanged escapement wheel 19 provided with a slot 43 and stop pin 45 and is adapted to prevent the movement of a pallet 20 except when the escapement wheel reaches a position in which a heel 44 on the pallet registers with the slot 43 in the flange of the wheel 19 and simultaneously the opening 21 in the mutilated wheel 17 is in the position opposite the pinion 16 and consequently out of gear until the exposure trigger is operated. In this position the lever or pallet 20 is allowed free movement and the exposure or shutter operating trigger 22 can be pushed down, thus actuating the lever 23 by means of the pin 24 shown in dotted lines in Fig. 6 and rotating the lever shaft 25 upon which is rigidly mounted the pallet 20 and consequently turning said pallet to a position in which the heel 44 of the pallet has passed the stop pin 45 and entered the escapement wheel through the slot 43. When the heel 44 has passed the pin 45 the said wheel 19 moves forward under the influence of the leaf spring 33 pressing the pin 34 of the mutilated wheel 17 which is mounted on the same shaft 18 as said escapement wheel 19. The movement of the pallet 20 causes a pin 26 thereon to engage the lever 27 and disengage it from the pin 42 on the gear 37 and thereby release the gearing operating the roller blind 9. As soon as the wheel 19 has moved forward under the influence of the spring 33, the pallet heel 44 is moved back behind the pin 45 to its first position under the influence of the spring 46 and the resetting of the shutter and change of the plate goes on again automatically. The rotation of the mutilated wheel 17 by the airscrew and with it the escapement wheel 19 turns said escapement wheel again to the position in which another exposure can be made by the operation of the trigger.

The mechanism actuating the blind shutter 9 is driven from the plate changing rack wheel shaft 36 through a gear wheel 37 loosely mounted on the said shaft, and actuated by a hammer 38 fast on the said shaft, which strikes a pin 39 mounted on said loose gear wheel 37, the latter being in engagement with a pinion 40, fast on the shaft carrying the blind roller through the intermediate wheel 41, the loose mounting of the gear 37 permitting the shutter to be reset. On the other side of the said gear wheel 37 is a pin 42 which engages a notch in the said pawl lever 27 to lock the shutter actuating mechanism until the operator moves the exposure trigger 22, the said lever 27 being operated by a pin 26 at one extremity of the pallet lever 20 as above described.

The capping flap 12 is operated from the pallet 20 through a bell crank lever 31 and connecting rod 32, one end of the connecting rod being connected to the bell crank lever and the other end to the pallet 20.

When the camera is operated mechanically by the handle 1 the locking pin 28 is changed over into the hole 52 to lock the mutilated wheel 17 to the casing cover 50.

The removal of the locking pin 28 which locks the handle 1 and the lever 29 mounted on the same shaft 2 to the segment 3 allows of the free movement of the segment under the direct control of the handle 1 through the connecting pin 35, the operation of the plate changing mechanism being carried out after each exposure by the handle as before described through the medium of the said toothed segment and the gearing operating on the plate carrier racks.

The crank 65, shown in Fig. 6, is used for adjusting the tension of the return spring for the focal plane blind. This crank is freely mounted on the shaft 18 but is rigidly attached to the gear wheel 10. This gear wheel 10 is shown in Fig. 4 in mesh with the train of gears driving spindle on which the return spring for the blind is mounted. The crank has no connection with the mutilated wheel 17 or the flanged escapement wheel 19. Inasmuch as the crank 65 forms no part of the present improvement, further description is deemed unnecessary.

Although the camera which I have described above is adapted for plates it can be equally as well adapted for roll film.

What I claim is:—

1. In a photographic camera of the type described, operating mechanism provided with means for manual actuation, and means for automatic actuation by connection with a power driven shaft, interchangeable means for locking the operating mechanism with either one of the actuating means employed and manually controlled exposure means.

2. In a photographic camera of the type described, operating mechanism provided with means for manual actuation, and means for automatic actuation by connection with a power driven shaft, interchangeable means for locking the operating mechanism with either one of the actuating means employed, manually controlled exposure means, and means to prevent the operation of the exposure means during the process of setting the shutter and changing the sensitized medium.

3. A photographic camera of the type described in which the train of gearing operating the plate changing mechanism is adapted to be connected with a train of gearing driven from an air screw or disconnected therefrom and manually operated by a handle and a locking member adapted to lock said handle to a connecting member between the two trains of gearing or to lock the train of gearing driven from the air screw in a position in which it is out of gear.

4. A photographic camera as claimed in claim 3 in which the mechanism for changing the plates and setting the shutter comprises a shaft having mounted thereon a handle rigidly connected with a segmental toothed member engaging with a pinion mounted upon a second shaft carrying a gear wheel in engagement with a rack on the plate carrier sliding in a rectangular framework.

5. A photographic camera of the type described, in which the train of gearing operating the mechanism for charging the sensitized medium is adapted to be connected with a train of gearing driven by an airscrew or propeller through a flexible shaft, comprising a shaft coupled to said flexible shaft carrying a worm wheel integral with a pinion engaging a larger mutilated toothed wheel, said mutilated wheel being mounted on a shaft carrying an escapement wheel controlling an escapement pallet, a manually operated handle connected to said first mentioned train of gearing and adapted to be locked to an arm connected to said mutilated wheel, and a locking member adapted to lock said handle to said arm or to lock the train of gearing driven from the air screw in a position in which it is out of gear.

6. In a photographic camera as claimed in claim 5, a shutter operating trigger adapted to be pushed down to turn the escapement pallet and release the gearing controlling the blind shutter.

7. A photographic camera as claimed in claim 3 in which the blind shutter mechanism comprises a gear wheel loosely mounted on the plate changing rack wheel shaft and a hammer fast on said shaft adapted to actuate said gear wheel which is provided with a pin in engagement with a pinion in one with the shaft carrying the blind roller.

8. A photographic camera as claimed in claim 5 in which a capping flap is operated from the escapement pallet through a bell crank lever and connecting rod.

9. A photographic camera of the type described, in which the train of gearing operating the mechanism for changing the sensitized medium is adapted to be connected with a train of gearing driven from an airscrew or disconnected therefrom, and manually controlled exposure means for effecting said connection with the airscrew.

In testimony whereof I sign my name to this specification.

F. C. V. LAWS.